(12) United States Patent
Lee et al.

(10) Patent No.: US 7,707,354 B2
(45) Date of Patent: Apr. 27, 2010

(54) SRAM CACHE AND FLASH MICRO-CONTROLLER WITH DIFFERENTIAL PACKET INTERFACE

(75) Inventors: Charles C. Lee, Cupertino, CA (US);
David Q. Chow, San Jose, CA (US);
Abraham C. Ma, Fremont, CA (US);
Frank Yu, Palo Alto, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 417 days.

(21) Appl. No.: 11/876,251

(22) Filed: Oct. 22, 2007

(65) Prior Publication Data

US 2008/0098164 A1 Apr. 24, 2008

Related U.S. Application Data (63) Continuation-in-part of application No. 09/478,720, filed on Jan. 6, 2000, now Pat. No. 7,257,714, and a continuation-in-part of application No. 11/624,667, filed on Jan. 18, 2007, and a continuation-in-part of application No. 09/366,976, filed on Aug. 4, 1999, now Pat. No. 6,547,130, and a continuation-in-part of application No. 11/309,594, filed on Aug. 28, 2006, now Pat. No. 7,383,362, and a continuation-in-part of application No. 10/707,277, filed on Dec. 2, 2003, now Pat. No. 7,103,684.

(51) Int. Cl.
*G06F 12/00* (2006.01)
(52) U.S. Cl. ...................................... 711/103
(58) Field of Classification Search ................. None
See application file for complete search history.

(56) References Cited

U.S. PATENT DOCUMENTS 5,566,110 A * 10/1996 Soenen et al. .......... 365/185.07

* cited by examiner

*Primary Examiner*—Brian R Peugh
(74) *Attorney, Agent, or Firm*—Stuart T. Auvinen; gPatent LLC (57) ABSTRACT

A flash microcontroller has a Static Random-Access-Memory (SRAM) buffer that stores several blocks of boot code read from a flash memory. The SRAM buffer also operates as a cache of flash data after booting is complete. Cache read and write hits use the SRAM cache rather than flash memory, while old cache lines and read misses access the flash memory. Both the external host and the microcontroller are booted from boot code buffered in the SRAM buffer. A boot-loader state machine reads the flash ID and programs flash parameter registers with timing parameters for the flash memory. The flash microcontroller uses a differential interface to the external host, with a differential transceiver and a differential serial interface. Frame, packet, and encoded clock processing is also performed by the serial interface.

20 Claims, 12 Drawing Sheets

SRAM CACHE AND FLASH MICRO-CONTROLLER WITH DIFFERENTIAL PACKET INTERFACE

RELATED APPLICATION

This application is a continuation-in-part (CIP) of the co-pending application Ser. No. 11/773,830 filed Jul. 5, 2007, for "Molding Method to Manufacture Single-Chip On-Board Device", which is a CIP of U.S. patent application for "Single Chip Multi-Media Card/Secure Digital (MMC/SD) Controller Reading Power-on Boot Code from Integrated Flash Memory for User Storage", U.S. application Ser. No. 11/309,594 filed Aug. 28, 2006, which is a CIP of "Single-Chip USB Controller Reading Power-on Boot Code from Integrated Flash Memory for User Storage", U.S. application Ser. No. 10/707,277, filed Dec. 2, 2003, now U.S. Pat. No. 7,103,684.

This is also a continuation-in-part (CIP) of the co-pending application for "Electronic Data Storage Medium with Fingerprint Verification Capability", U.S. Ser. No. 11/624,667 filed Jan. 18, 2007, which is a divisional application of U.S. patent application Ser. No. 09/478,720, filed on Jan. 6, 2000, which has been petitioned to claim the benefit of CIP status of one of inventor's earlier U.S. patent applications for "Integrated Circuit Card with Fingerprint Verification Capability", U.S. application Ser. No. 09/366,976, filed Aug. 4, 1999, now issued as U.S. Pat. No. 6,547,130.

This application is related to "Flash memory device and architecture with multi level cells", U.S. Ser. No. 10/800,228, filed Mar. 12, 2004, now U.S. Pat. No. 7,082,056, and "Flash drive/reader with serial-port controller and flash-memory controller mastering a second RAM-buffer bus parallel to a CPU bus", U.S. Ser. No. 10/605,140, filed Sep. 10, 2003, now U.S. Pat. No. 6,874,044.

FIELD OF THE INVENTION

This invention relates to flash micro-controllers, and more particularly to flash microcontrollers with a cache SRAM for booting an external device over a differential interface.

BACKGROUND OF THE INVENTION

Hard disks and other mass storage devices are being replaced or supplemented with solid-state mass storage such as flash memories. Flash memories use non-volatile memory cells such as electrically-erasable programmable read-only memory, (EEPROM), but are not randomly accessible at the byte level. Instead, whole pages or sectors of 512 bytes or more are read or written together as a single page. NAND flash memory is commonly used for data storage of blocks. Pages in the same block may have to be erased together, and limitations on writing may exist, such as only being allowed to write each page once between erases.

Program code is often stored in randomly-accessible memory such as a ROM or a NOR flash memory. Since NOR flash memory is byte-addressable, NOR flash can store code that can be executed. Byte-addressing is needed to execute code, since branch and jump instructions may have a target that is at a random location that must be fetched next. The target may be byte-addressable. Since boot routines execute instructions one at a time, rather than a whole page at a time, randomly-accessible memory is needed for boot-code execution.

Small portable devices such as personal digital assistants (PDA), multi-function cell phones, digital cameras, music players, etc. have a central processing unit (CPU) or microcontroller that must be booted just as a PC or host CPU must be booted. These small devices are often quite cost and size sensitive. Having a NOR flash or ROM may increase the size and cost of these portable devices.

NAND flash memory is less expensive than NOR flash memory, and thus preferable from a cost standpoint. NAND flash memory may already be present on some devices such as cell phones or music players as the primary mass storage memory. It is thus desirable to use NAND flash memory to store boot code.

Computers once required a complex series of steps to initialize and make them ready to run programs. Instructions for bootstrapping the computer were loaded into the computer after power-on, such as by manually toggling switches representing the 1's and 0's of bootstrap instructions on the front panel. The computer was brought from a dead state into a useful state, like lifting the computer up by its own bootstraps.

More recently, computers still execute a complex sequence of instructions after power-on to boot the computer and load its operating system (OS). The initial instructions may reside in a read-only memory (ROM), along with a personal computer's Basic Input-Output System (BIOS). The operating system such as Windows may be loaded from the hard disk, and when booting is complete the OS can execute user programs. Various system checks such as peripheral device and memory detection and sizing can be performed during booting.

Both the flash device and the host must be booted at some point in time. Typically, the host is booted from its hard disk before the flash device is inserted into the host. The flash device is then booted when power from the host reaches the flash device.

Cache memories are commonly used by host computers. A cache of the flash memory is desirable. Using this cache memory for booting both the flash-memory device and the external host is also desirable.

What is desired is a flash-memory microcontroller that is bootable from boot code stored in flash memory. It is further desired to boot both the flash microcontroller and the host. A flash microcontroller with a differential interface to the external host that is used to transfer boot code to the external host is also desired.

DETAILED DESCRIPTION

The present invention relates to an improvement in flash microcontrollers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
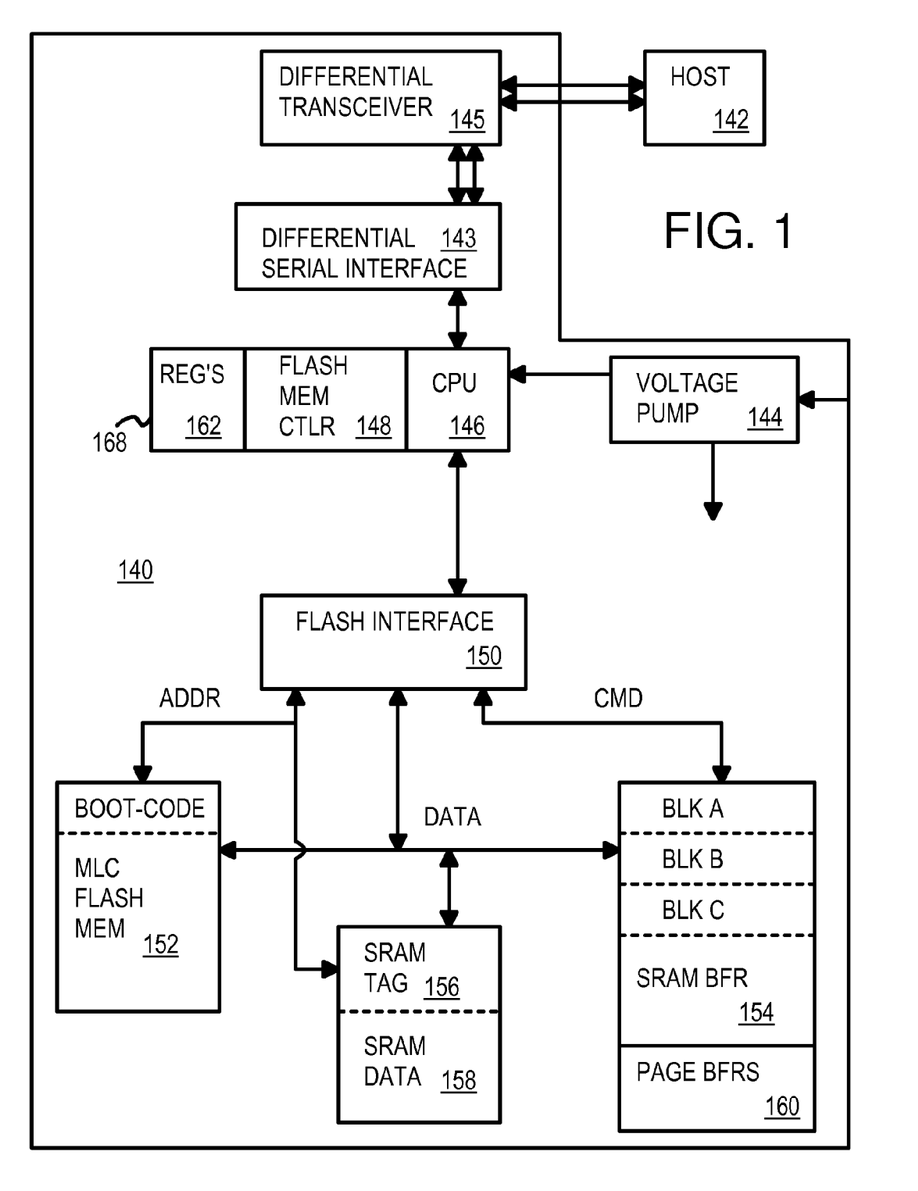
FIG. 1 is a block diagram of a flash microcontroller with a differential interface to an external host that receives host boot code from a boot-loader SRAM for dual-device booting.

FIG. 1 is a block diagram of a flash microcontroller with a differential interface to an external host that receives host boot code from a boot-loader SRAM for dual-device booting. Flash device 140 is plugged into host 142 and powers up when plugged in.

Flash device 140 generates internal supply voltages from an external power supply input using voltage pump 144. Central Processing Unit (CPU) 146 processes commands from host 142 which update operating registers 162 which control operation of flash memory controller 148. Operating registers 162, CPU 146, and flash memory controller 148 may be part of microcontroller 168.

A high-speed differential interface is placed between host 142 and flash device 140. Commands, addresses, and data are received as serial data by differential transceiver 145, and responses and data are sent back to host 142 by differential transceiver 145.

Differential serial interface 143 receives a serial stream of data from differential transceiver 145 and extracts commands, data, and addresses from packets sent over the differential interface, and performs transaction handshaking or other requirements of the differential protocol. Differential serial interface 143 also generates headers, checksums, and divides data into multiple packets for transmission over the differential interface to host 142 by differential transceiver 145.

Flash interface 150 provides a lower-level memory interface to multi-level-cell MLC flash memory 152, which may contain one or more flash-memory chips, and to SRAM. SRAM buffer 154 may contain block and page buffers of data that is stored in MLC flash memory 152, such as boot code. SRAM buffer 154 stores both blocks and smaller pages. Pages are stored in page buffer 160.

Flash interface 150 generates signals for address, data, and command buses and associated control signals to the physical memory devices, both flash and SRAM. A SRAM cache of the data in MLC flash memory 152 is also provided by SRAM data cache 158, with its associated tags stored in SRAM tags 156. Requests that match SRAM tags 156 may be accessed in SRAM data cache 158, which has a faster access time than MLC flash memory 152.

Figure 2:
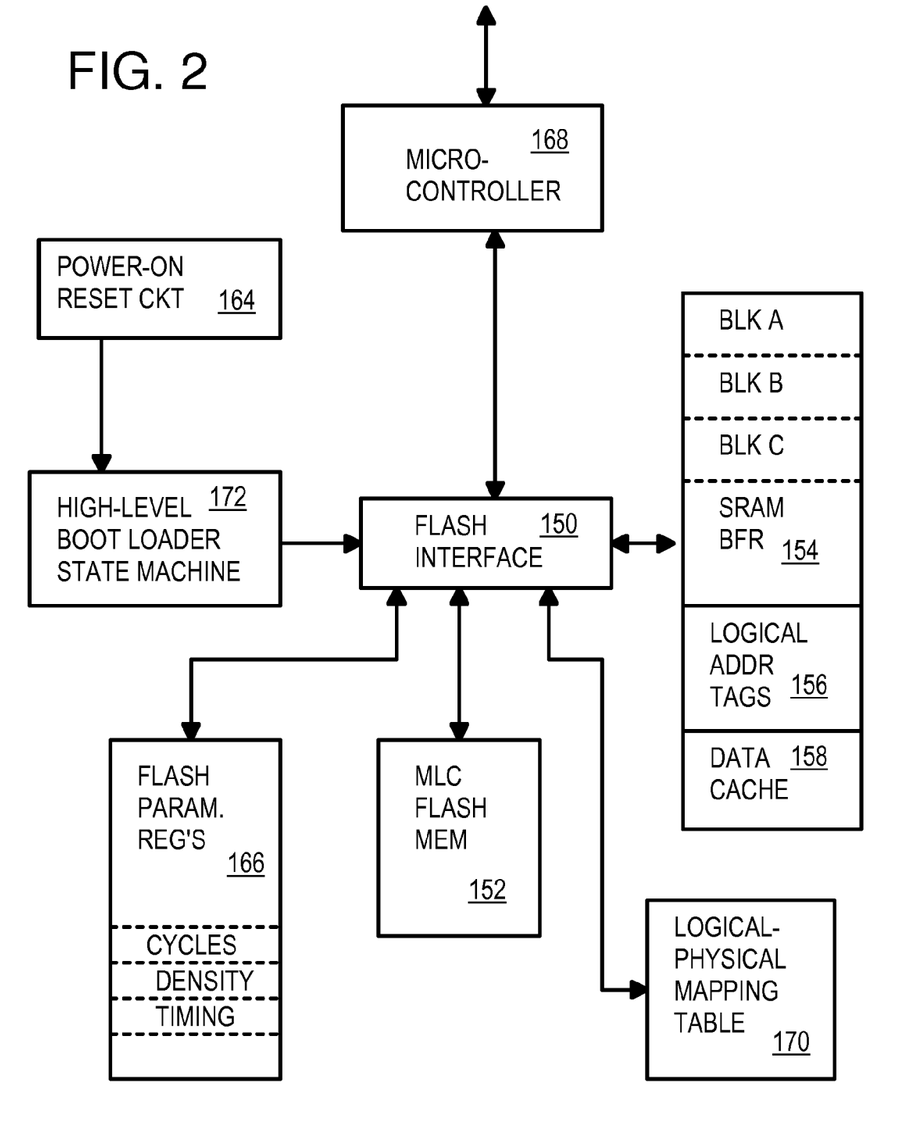
FIG. 2 shows a flash device in more detail.

FIG. 2 shows a flash device in more detail. Microcontroller 168 receives high-level requests from a host using a bus protocol and generates lower-level memory-access commands that are sent to flash interface 150. Flash interface reads, writes, and erases flash memory in MLC flash memory 152, but can also access data more quickly using SRAM buffers 154. SRAM buffers 154 is an array of SRAM that can be partitioned into a cache with SRAM tags 156 and SRAM data cache 158.

SRAM buffers 154 can also include buffers used to store boot code that is read from MLC flash memory 152. Blocks A, B, C can store blocks of boot or operating system (OS) code read from MLC flash memory 152. When power-on is detected by power-on reset circuit 164, boot-loader state machine 172 can be activated. Boot-loader state machine 172 configures flash interface 150 by reading parameters from a flash ID and programming these flash parameters into flash parameter registers 166 for use by flash interface 150. These flash parameters are device-specific, and include device specifications such as the density and width of MLC flash memory 152, the number of cycles needed for access, and other timing requirements that must be met. Once boot-loader state machine 172 configures flash interface 150, boot-loader state machine 172 activates flash interface 150 to read the first page of the first block from MLC flash memory 152. This first page contains system pointers to boot code in the flash. These pointers are flowed to locate instructions to jump to in the initial boot code, or in extended boot code. Additional boot code, control programs, and OS images are successively read from MLC flash memory 152 and loaded into SRAM buffers 154 for execution by the CPU in microcontroller 168. Once this CPU is booted and running its OS, more boot code for the external host may be read from MLC flash memory 152 and sent to the host, so that the host can be booted.

Once the host is booted, mappings from host (logical) addresses to flash (physical) addresses may be stored in mapping table 170. Flash interface 150 uses these mappings in mapping table 170 to locate physical pages in MLC flash memory 152 that correspond to the logical addresses from host requests.

Figure 3:
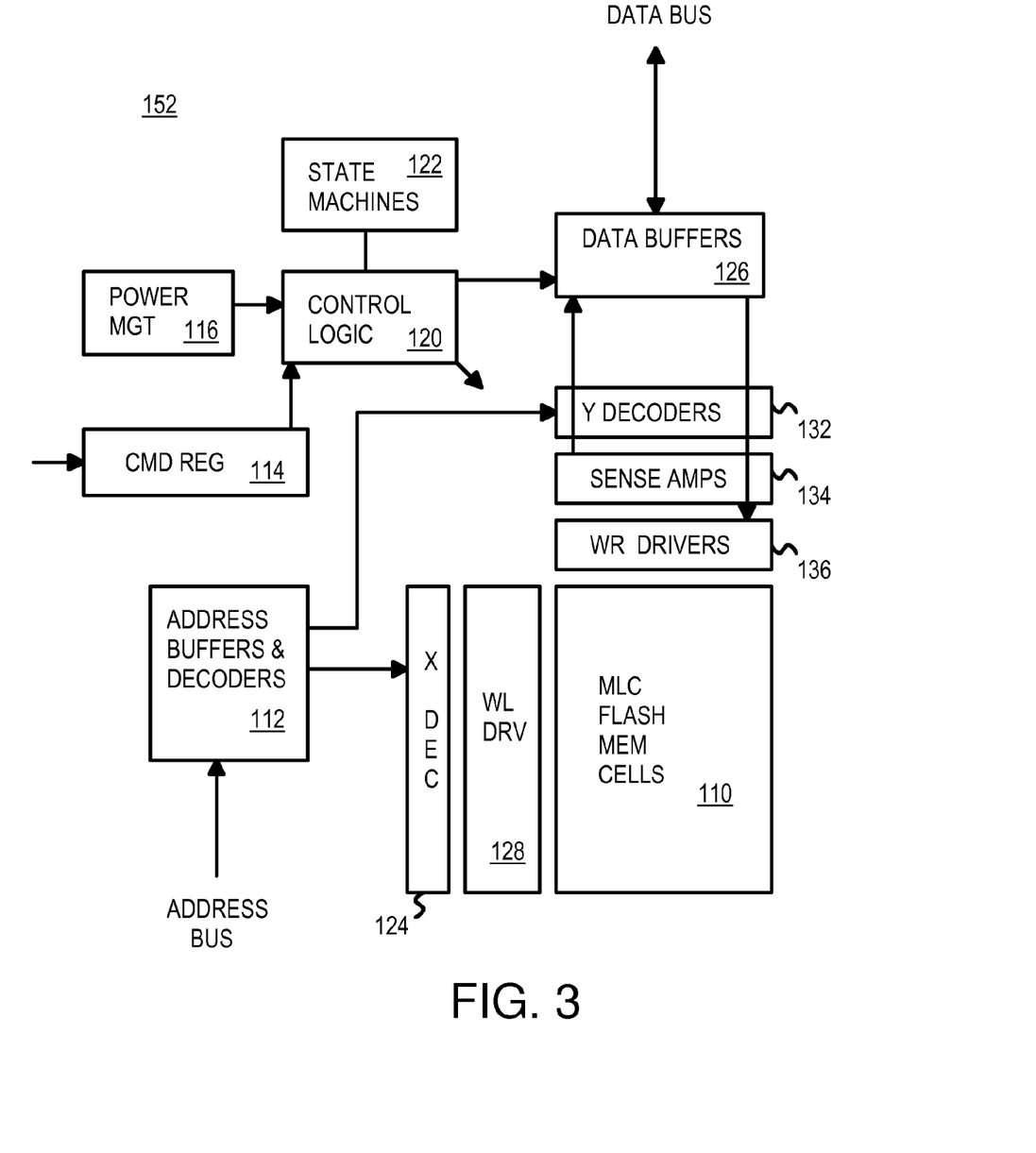
FIG. 3 shows a flash memory.

FIG. 3 shows a flash memory. Flash memory 152 may include some or all of the blocks shown in FIG. 3, and other blocks, or some of the functions may be performed by a separate flash controller. Flash memory 152 may be a separate flash chip or may be integrated with the flash microcontroller.

Flash-memory MLC cells 110 is an array of rows and columns of multi-level cell (MLC) EEPROM transistors that can store multiple bits of data in each memory cell using different voltage levels. The MLC cell's voltage levels are sensed by sense amplifiers 134 when a read current is drawn through a selected row of MLC cells. Word line drivers 128 drives one row or word line in MLC cells 110 while the other rows are disabled. A row portion of an address applied to address decoder 112 is further decoded by X decoder 124 to select which row to activate using word line drivers 128.

A column portion of the address applied to address decoder 112 is further decoded by Y decoder 132 to select a group of bit lines for data access. Data buffers 126 may be a limited width, such as 64 bits, while MLC cells may have a larger number of bit lines, such as 8×64 columns. One of the 8 columns may be selected by Y decoder 132 for connection to data buffers 126.

During writing, external data is collected by data buffers 126 and applied to write drivers 136. Write drivers 136 generate voltages or currents so that the set currents are applied to bit lines for MLC cells that are to be written with a 1, while reset currents are applied to bit lines for MLC cells to be reset to 0.

State machines 122 can activate control logic 120 to enable and disable write drivers 136 after programming or erasure. State machines 122 can generate various internal control signals at appropriate times, such as strobes to pre-charge bit lines and latch sensed data into data buffers 126.

Command register 114 can receive commands that are decoded and processed by control logic 120. External control signals such as read/write, data strobes, and byte enables may also be received in some embodiments. Command register 114 may be replaced by a command decoder in some embodiments. Power management unit 116 can power down blocks to reduce power consumption, such as when the MLC flash memory is de-selected. Since MLC cells 110 are non-volatile, data is retained when power is disconnected.

There may be several arrays of MLC cells 110 and associated logic on a large MLC flash chip. An array-select portion of the address can be decoded by address decoders 112 to enable one of the many arrays or blocks on the MLC flash memory or chip.

Figure 4:
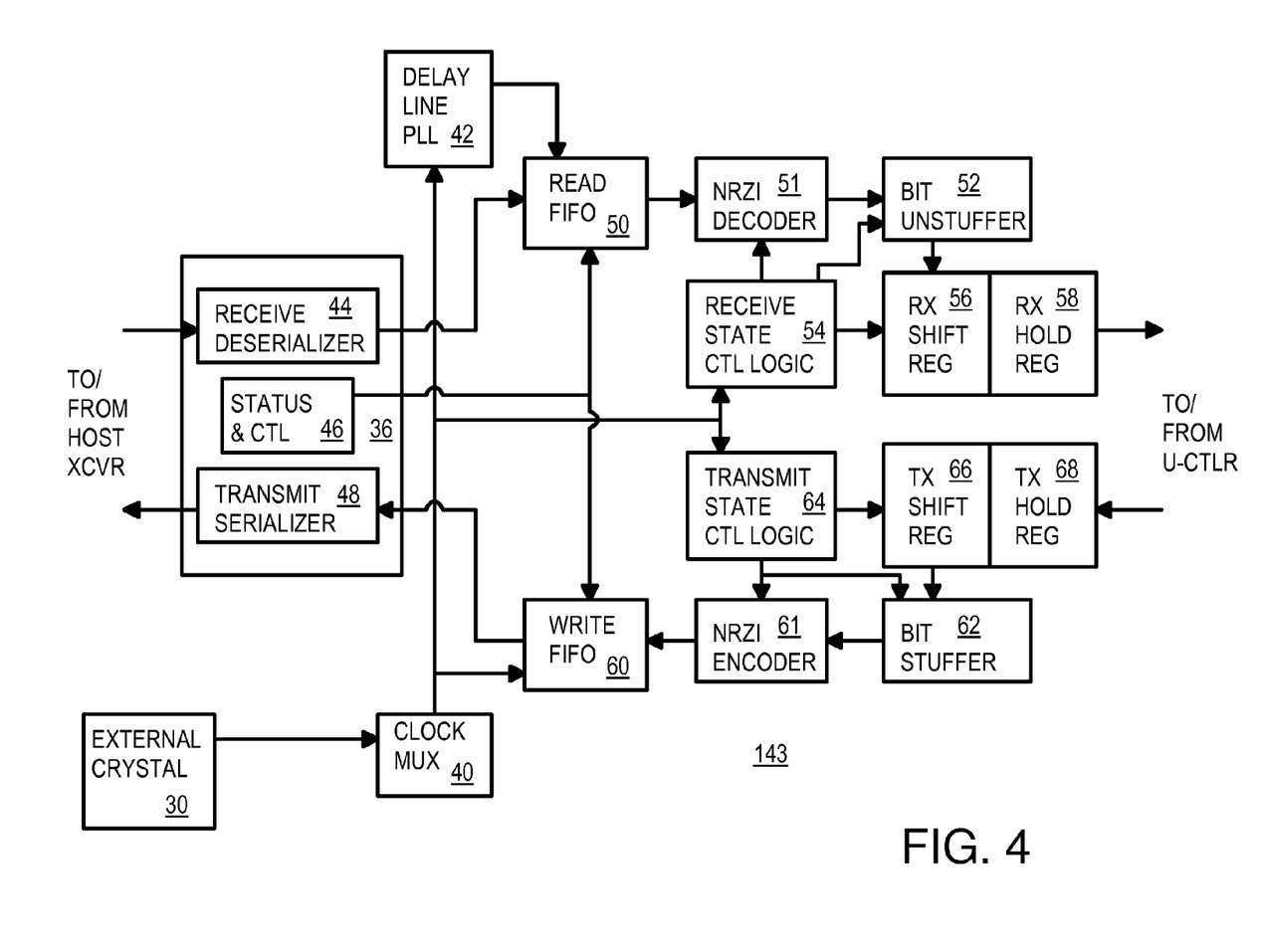
FIG. 4 shows a differential serial interface for a flash microcontroller in more detail.

FIG. 4 shows a differential serial interface for a flash microcontroller in more detail. Host serializing unit 36 connects to differential transceiver 145 (FIG. 1) while receive hold register 58 and transmit hold register 68 connect to microcontroller 168. Differential serial interface 143 operates between differential transceiver 145 to host 144, and microcontroller 168.

Host serializing unit 36 includes receive deserializer 44 which forms parallel data from the serial data stream received from the host, and transmit serializer 48, which converts parallel data into a serial data stream for differential transmission to the host. Status and control registers 46 controls and reports the status of operation of host serializing unit 36.

External crystal 30 provides a clock signal to clock mux 40, which selects a clock to apply to delay line phase-locked loop (PLL) 42. PLL 42 generates a clock to read FIFO 50, which stores the deserialized data from receive deserializer 44. Parallel data is also clocked out of write FIFO 60 to transmit serializer 48 by the clock from PLL 42.

Receive data is processed by NRZI decoder 51 to remove not-return-to-zero decoding of the differential data. Bit unstuffer 52 removes stuff bits that were added by the host to fill packets or frames. Receive shift register 56 then shifts the decoded, unstuffed data into receive hold register 58 for use by microcontroller 168. Receive state control logic 54 controls operation of the receive path.

Transmit state control logic 64 controls operation of the transmit path. Data from microcontroller 168 is latched into transmit hold register 68 and then shifted through transmit shift register 66 to bit stuffer 62, which adds stuffing bits as needed to fill out packets or frames to the protocol-specified size. NRZI encoder 61 converts the data to not-return-to-zero encoding as differential data. The NRZI data is then stored in write FIFO 60 for later transmission as differential data. NRZI decoder 51 and NRZI encoder 61 can be an 8-10 bit encoder/decoder in some embodiments. Other modifications to NRZI decoder 51 and NRZI encoder 61 can be made for use with other protocols such as PCIE, USB 3.0, etc.

Figure 5:
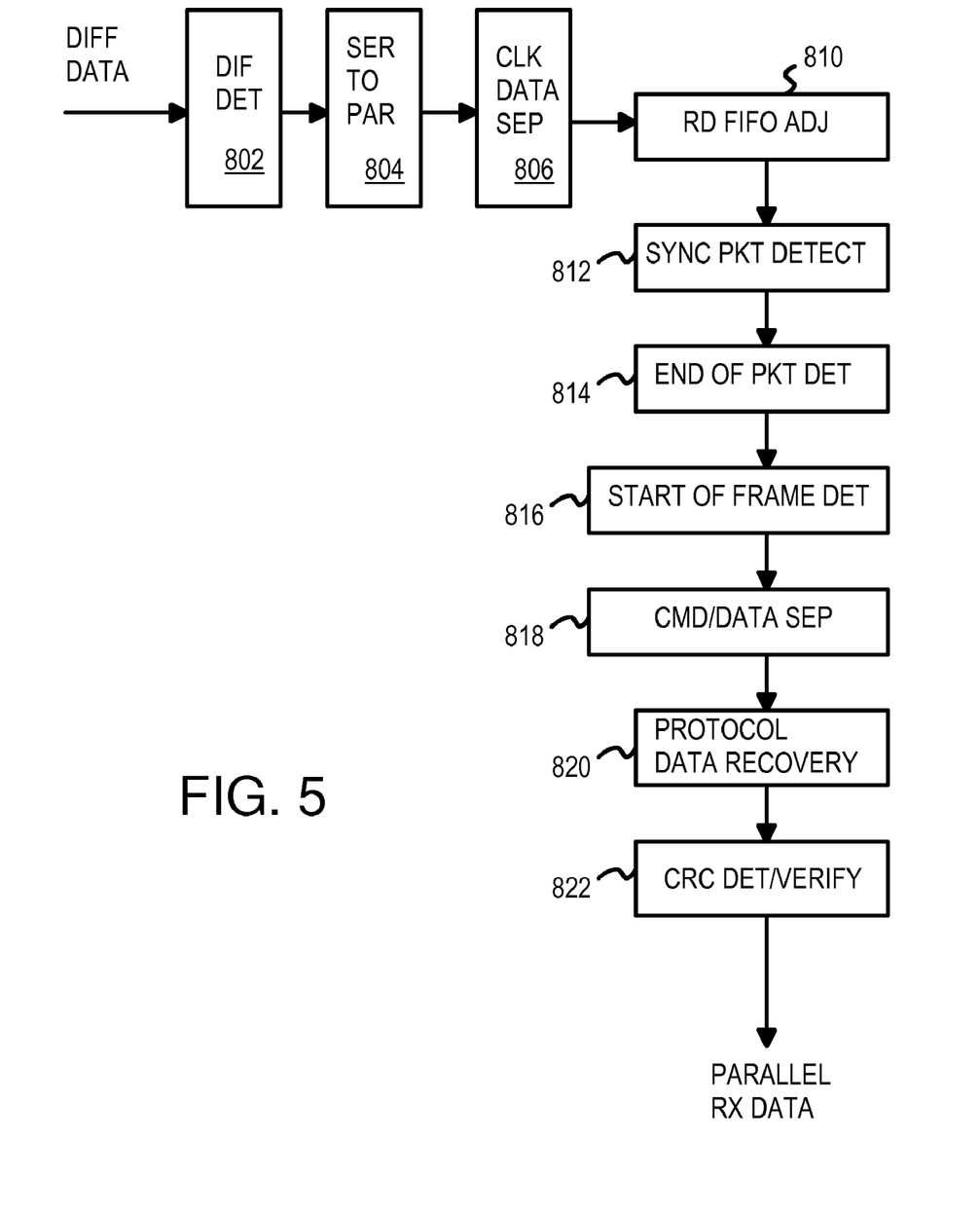
FIG. 5 shows the differential receive path in more detail.

FIG. 5 shows the differential receive path in more detail. A serial stream of data from differential transceiver 145 is amplified from a small-swing signal to a larger swing by differential detector 802 and converted to parallel data words by converter 804. The clock is extracted or recovered from the data stream by clock separator 806. Read-FIFO adjuster 810 adjusts the timing of data as it is stored into the read FIFO. Sync packet detector 812 searches for the packet's sync pattern while end of packet detector 814 searches for end-of-packet markers in the data stream. Frame detector 816 searches for frame markers.

Command and data separator 818 locates commands in the data stream and separates these commands from the data. Data recovery unit 820 recovers the protocol data within the data stream, while checksum unit 822 generates a running checksum or cyclical-redundancy-check (CRC) of the recovered data and compares the checksum to a transmitted checksum to verify the data transmission. The parallel data may then be sent to microcontroller 168 for use by the flash interface. This parallel data may include addresses, flash commands, and data for the flash interface.

Figure 6:
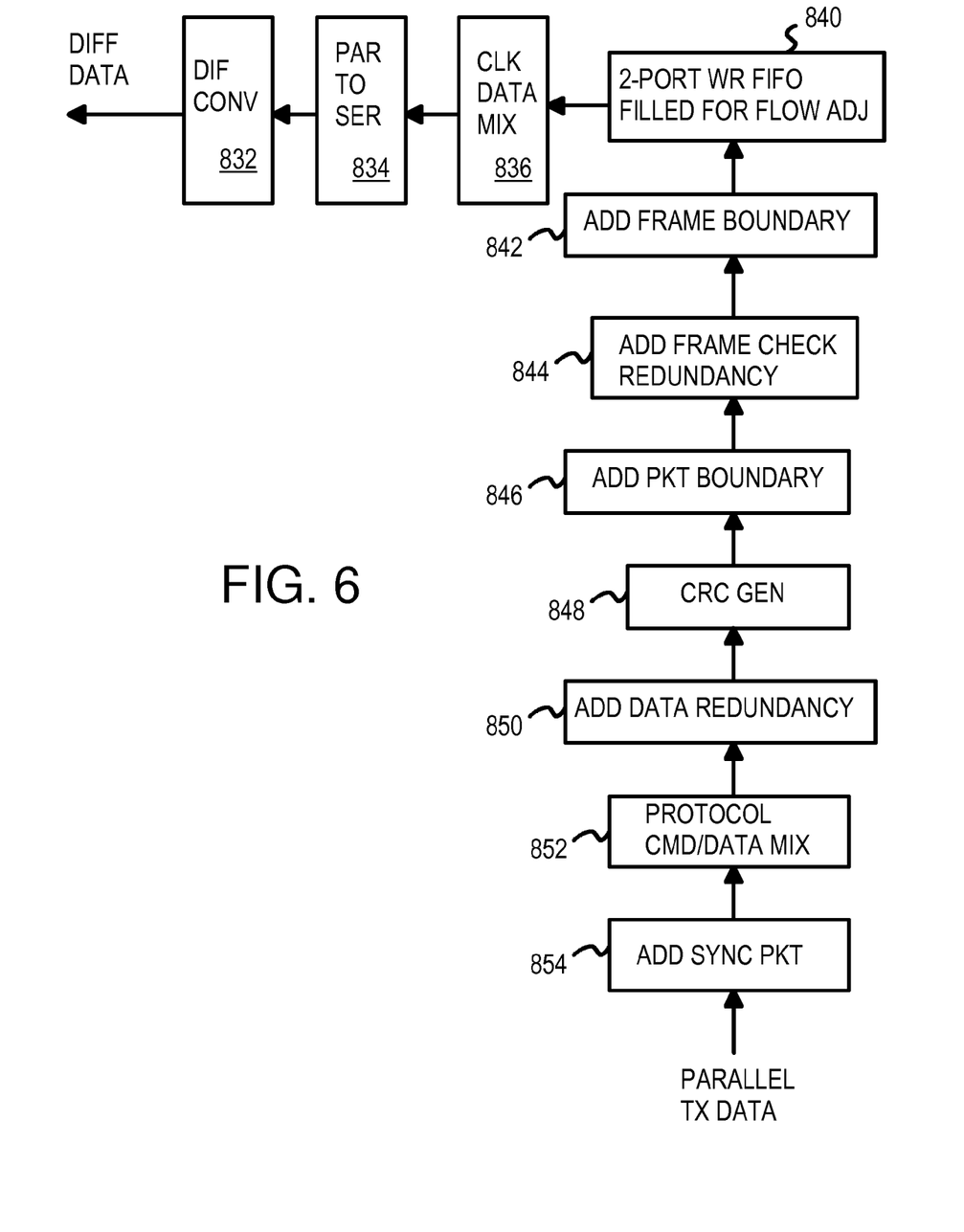
FIG. 6 shows the differential transmit path in more detail.

FIG. 6 shows the differential transmit path in more detail. Parallel transmit data from microcontroller 168 is latched and a sync packet marker is added by sync packet unit 854. Commands and data are mixed together according to the differential protocol by protocol mixer 852. Data redundancy such as a CRC or checksum is added by checksum unit 850. The CRC or checksum is generated by CRC generator 848.

Packet boundaries are added by packetizer 846, while frame boundaries are added by frame boundary unit 842 after frames are checked and any frame redundancy or stuff bits are added by frame checker 844. Dual-port write FIFO 840 buffers the data stream and adjusts the flow for stream synchronization. A transmit clock is mixed in with the data stream, and encoding such as NRZI decoding is added by clock mixer 836. The parallel data words are converted to serial data by sterilizer 834 and the serial data is further formatted in the differential, serial format by differential converter 832, which creates a small-voltage-swing analog signal for transmission.

Figure 7A:
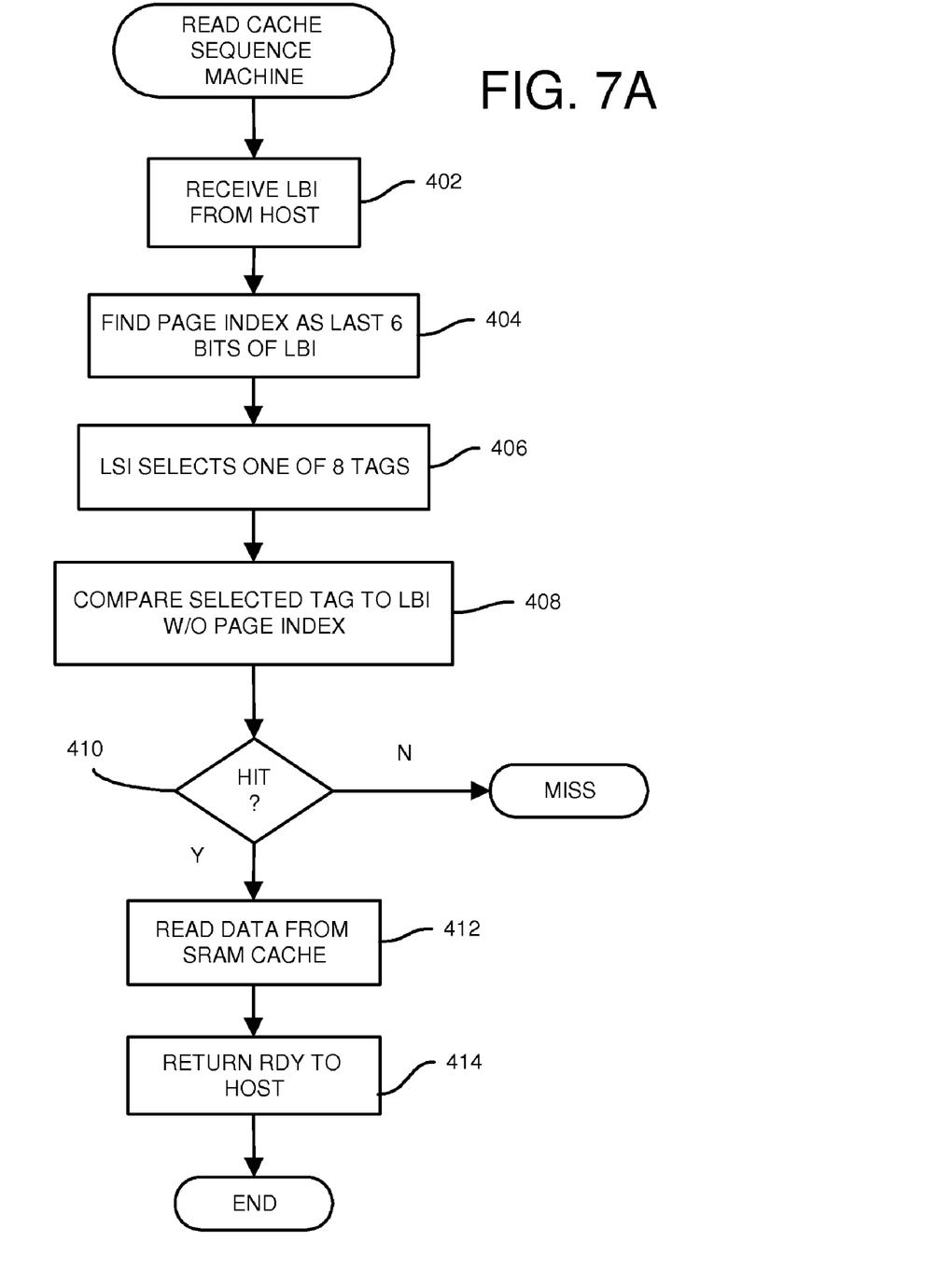
FIGS. 7A-B are flowcharts of read cache operations of the SRAM buffer.
Figure 7B:
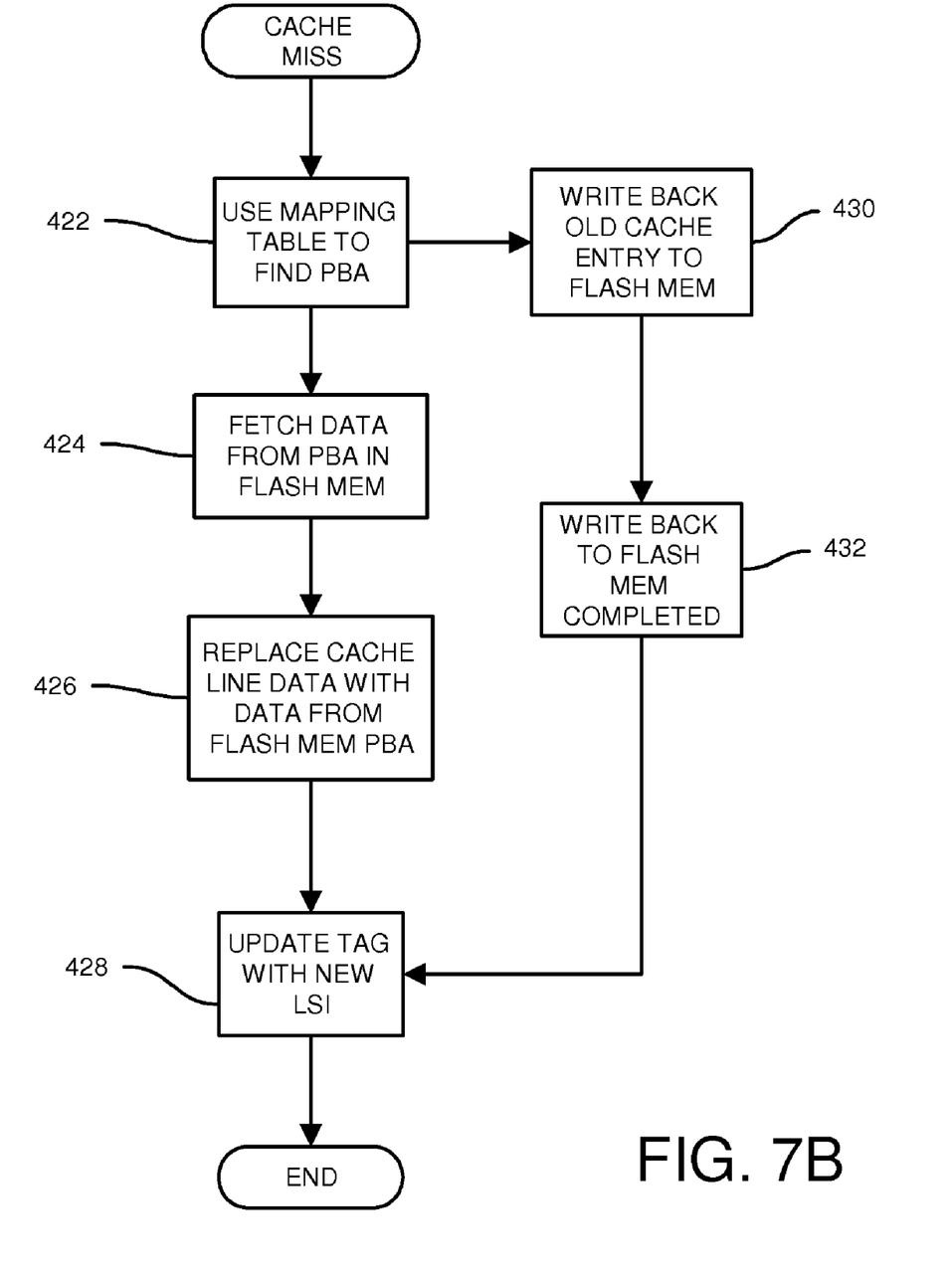

FIGS. 7A-B are flowcharts of read cache operations of the SRAM buffer. The SRAM buffer can be used for blocks of boot code read by the local CPU or the external host CPU during booting. Once booting is completed, some or all of this boot code may not longer be needed. The SRAM buffer could then be used for caching data from the flash memory. Alternately, the size of the SRAM buffer could be large enough for both a cache and for boot-code blocks for boot code storage.

In FIG. 7A, a read request of the flash memory is received from the host. The host address is a logical address, and the logical block index (LBI) is extracted from the host logical address, step 402. The last 6 bits of the LBI are extracted as the page index, step 404. The logical sector index (LSI), which is the lower part of the logical address that does not include the LBI, selects one of the tags in the cache, step 406, while the page index selects the row within the cache. The selected tag has a stored tag address that corresponds to the LBI without the page index, and this stored tag is compared to the LBI without the page index, step 408, to determine whether an address match has been found.

When the address matches, and a valid bit indicates that the cached data is valid, a hit occurs, step 410. Then the requested data is read from the data portion of the cache in the SRAM buffer for that page index and selected sector (LSI), step 412. The requested data is sent by the microcontroller to the host over the differential interface, and a ready signal is returned to the host, step 414.

When a hit does not occur, step 410, then a cache miss occurs. In FIG. 7B, mapping table 170 (FIG. 2) is consulted with the logical address to find the physical address in the flash memory, step 422. Any old data in the cache line is written back to flash memory, step 430. The physical address from mapping table 170 is used to fetch data from the flash memory, step 424. This fetched data is written into the data fields of the cache line, step 426 and is returned to the host along with the ready signal.

Once the write back of the old cache line is completed, step 432, then the tag address can be updated with the new address using the LBI without the page index, since the page index selects the line within the cache. The LSI selects which sector-tag within the line to update, step 428.

Figure 8A:
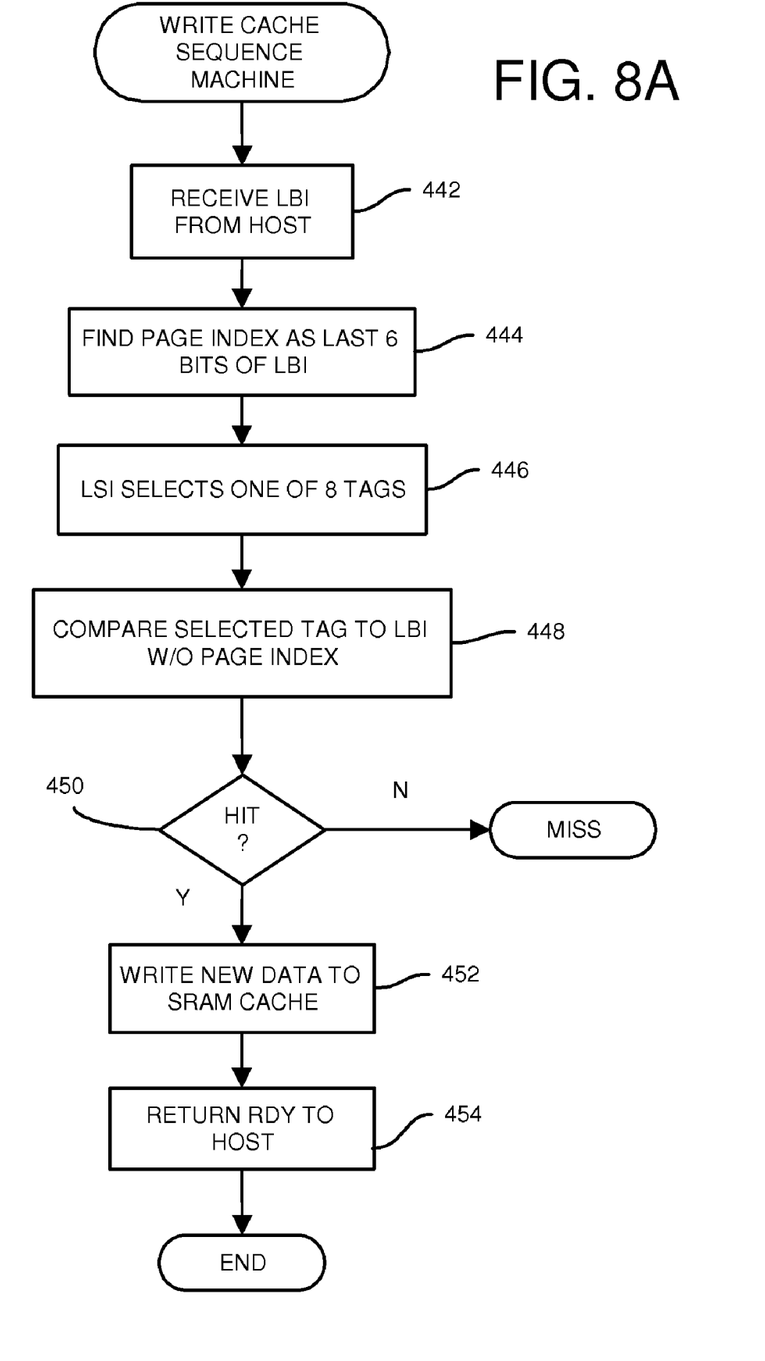
FIGS. 8A-B are flowcharts of write cache operations of the SRAM buffer.
Figure 8B:
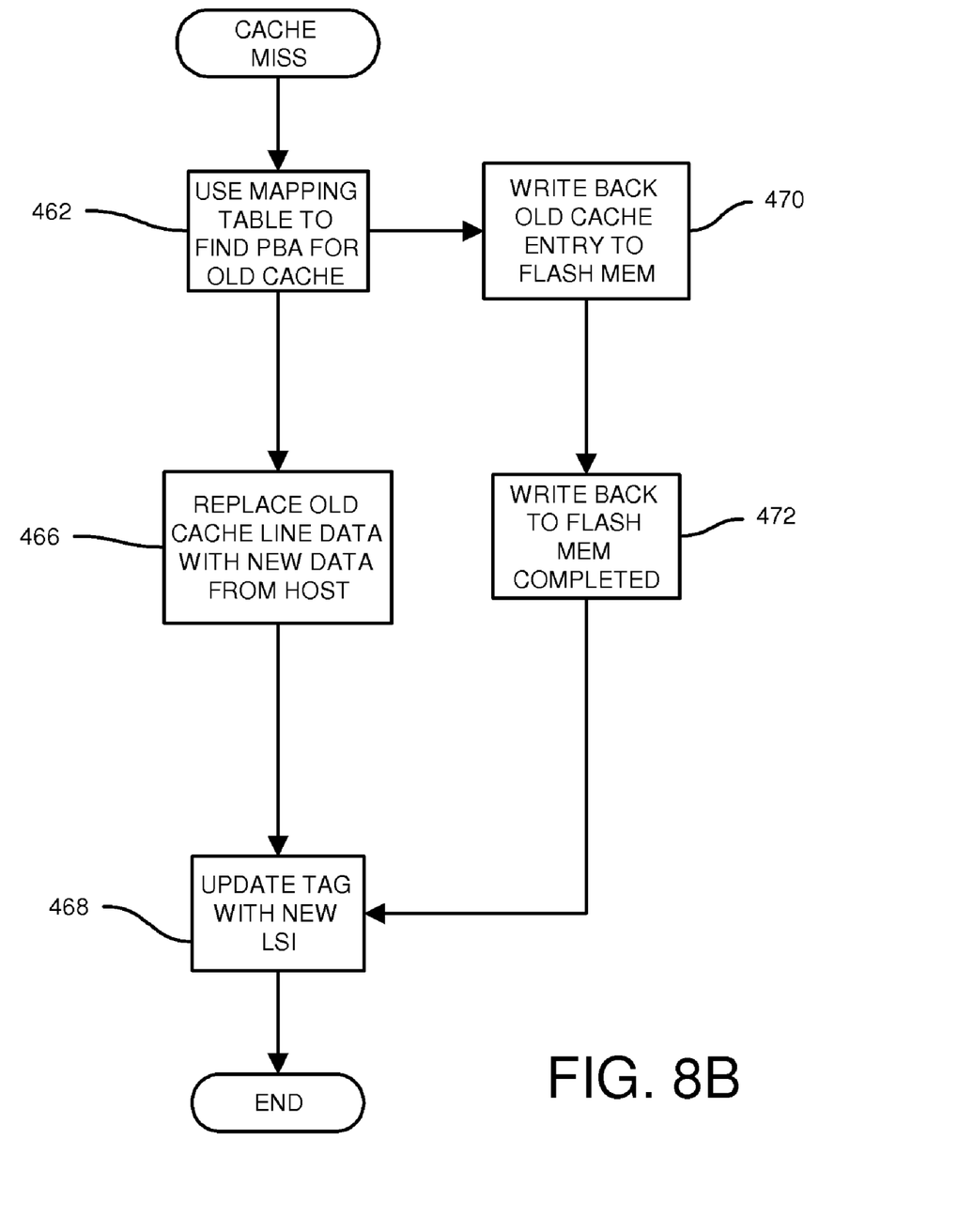

FIGS. 8A-B are flowcharts of write cache operations of the SRAM buffer. In FIG. 8A, a write request of the flash memory is received from the host. The host address is a logical sector address, and the logical block index (LBI) is extracted from the host logical address, step 442. The last 6 bits of the LBI are extracted as the page index, step 444. The logical sector index (LSI), which is the lower part of the logical address that does not include the LBI, selects one of 8 tags in the cache, step 446, while the page index selects the row within the cache. The selected tag has a stored tag address that corresponds to the LBI without the page index, and this stored tag is compared to the LBI without the page index, step 448, to determine whether an address match has been found.

When the address matches, step 450, then the host data is written to the data portion of the cache in the SRAM buffer for that page index and selected sector (LSI), step 452. The ready signal is returned to the host, step 454.

When a hit does not occur, step 450, then a cache miss occurs. In FIG. 8B, mapping table 170 (FIG. 2) is consulted with the logical address to find the physical address in the flash memory, step 462. Any old data in the cache line is written back to flash memory, step 470, using this physical address from mapping table 170.

The host data is written into the data fields of the cache line, step 466. Once the write back of the old cache line is completed, step 472, then the tag address can be updated with the new address using the LBI without the page index, since the page index selects the line within the cache. The LSI selects which sector-tag within the line to update, step 468.

Figure 9:
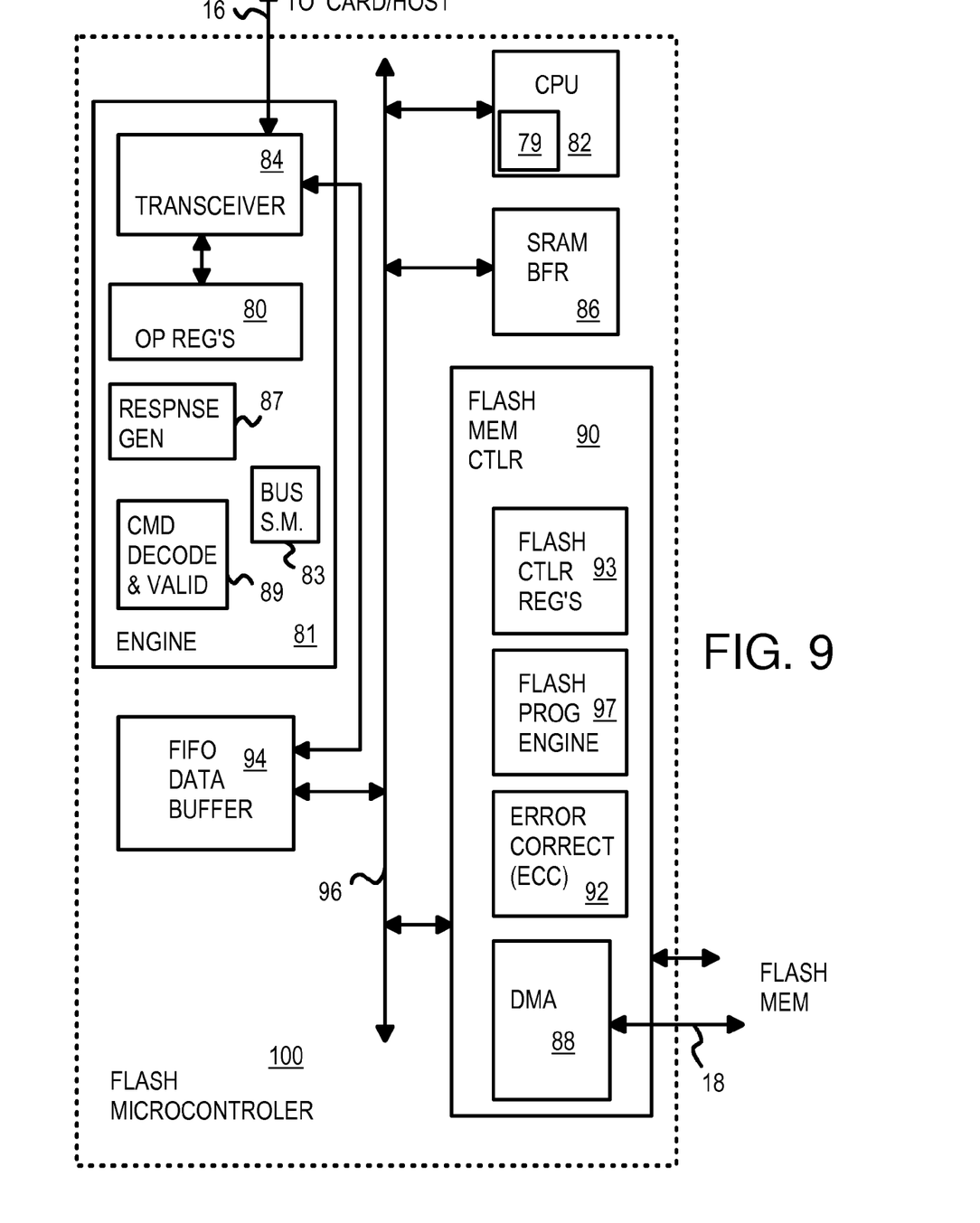
FIG. 9 is a block diagram of a Secure-Digital (SD) flash microcontroller.

FIG. 9 is a block diagram of a Secure-Digital (SD) flash microcontroller. SD flash microcontroller 100 can be booted from external flash memory.

Internal bus 96 connects CPU 82 with SRAM 86, FIFO data buffer 94, direct-memory access (DMA) engine 88, and flash-memory controller 90. CPU 82 executes instructions read from SRAM 86, using cache 79 to cache instructions and/or data.

DMA engine 88 can be programmed to transfer data between FIFO data buffer 94 and flash-memory controller 90. CPU 82 can operate on or modify the data by reading the data over bus 96. Cache 79 and external RAM can store instructions for execution by the CPU and data operated on by the CPU.

SD transceiver 84 connects to the clock CLK and parallel data lines D0:3 of SD bus 16 and contains both a clocked receiver and a transmitter. An interrupt to CPU 82 can be generated when a new command is detected on SD bus 16. CPU 82 can then execute a routine to handle the interrupt and process the new command.

SD operating registers 80 include the protocol registers required by the SD specification. Registers may include a data-port, write-protect, flash select, flash status, interrupt, and identifier registers. Other extension registers may also be present.

Command decode and validator 89 detects, decodes, and validates commands received over SD bus 16. Valid commands may alter bus-cycle sequencing by bus state machine 83, and may cause response generator 87 to generate a response, such as an acknowledgement or other reply. Different routines can be executed by CPU 82 or different transfer lengths can be performed by DMA engine 88 in response to the byte or sector capacity detected by command decode and validator 89.

The transmit and receive data from SD engine 81 is stored in FIFO data buffer 94, perhaps before or after passing through a data-port register in SD operating registers 80. Commands and addresses from the SD transactions can also be stored in FIFO data buffer 94, to be read by CPU 82 to determine what operation to perform.

Flash-memory controller 90 may also include a flash data buffer, which may contain the commands, addresses, and data sent over flash bus 18 to one or more flash mass-storage chips. Data can be arranged to match the bus width of flash bus 18, such as in 32 or 94-bit words. DMA engine 88 can be programmed by CPU 82 to transfer a block of data between flash bus 18 and FIFO data buffer 94.

Flash-specific registers in flash control registers 93 may include a data port register, interrupt, flash command and selection registers, flash-address and block-length registers, and cycle registers.

Error-corrector 92 can read parity or error-correction code (ECC) from flash mass storage chips and perform data corrections. The parity or ECC bits for data in that is being written to flash mass storage chips can be generated by error-corrector 92.

Flash programming engine 97 can be a state machine that is activated on power-up reset. Flash programming engine 97 programs DMA engine 88 with the address of the boot loader code in the first page of the external flash mass-storage chip, and the first address in cache 79 or in another local RAM, or in SRAM 86. Then flash programming engine 97 commands DMA engine 88 to transfer the boot loader from the flash mass storage chip to cache 79 or the other SRAM buffer, or to the external RAM. CPU 82 is then brought out of reset, executing the boot loader program starting from the first address in cache 79 or the SRAM buffer. The boot loader program can contain instructions to move a larger control program from the flash mass storage chip to SRAM 86. Thus SD flash microcontroller 100 is booted without an internal ROM on internal bus 96.

Figure 10:
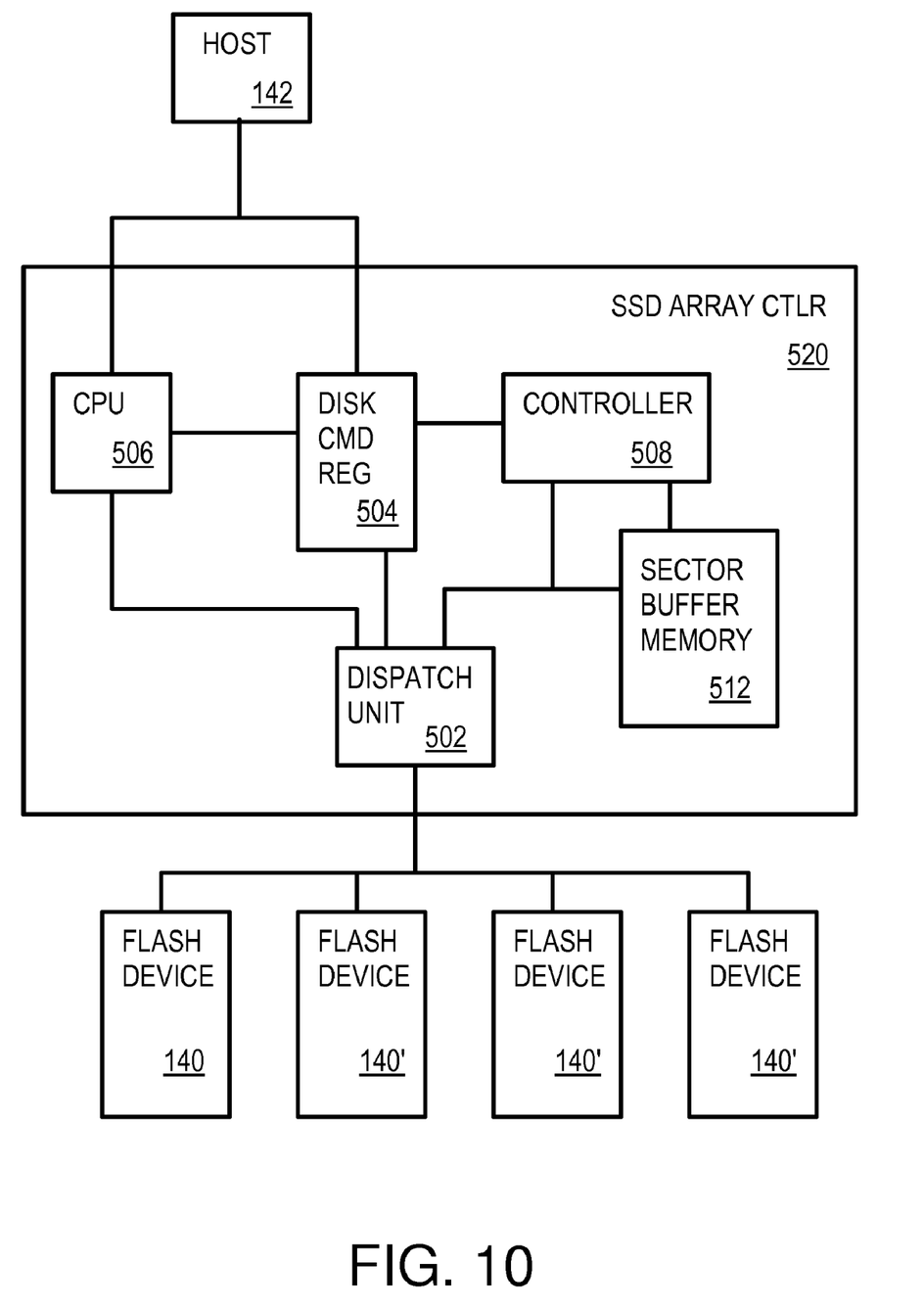
FIG. 10 is a diagram showing multiple flash devices ganged together in a solid-state-disk array.

FIG. 10 is a diagram showing multiple flash devices ganged together in a solid-state-disk array. Each of multiple flash devices 140, 140' contains differential transceiver 145, microcontroller 168, flash interface 150, SRAM buffer 154, flash memory 152, etc. as shown earlier in FIGS. 1-4. Host 142 is able to access a much larger amount of flash memory by ganging multiple flash devices 140, 140' together using SSD array controller 520.

As the density of flash devices grows rapidly, each flash device has its own control unit to cover first-level booting as well as wear-leveling and other housekeeping work, such as bad-block management. It is more efficient for a SSD array to adopt this cluster approach as to decentralize the heavy load of microcontroller 168 described earlier. A differential interface is preferred in this application; however, other non-differential interfaces such as SD, MMC etc, may also be applicable in this clustering SSD-array approach.

SSD array controller 520 is a solid-state-disk array controller that receives commands from host 142 and dispatches these commands to one of multiple flash devices 140, 140' using dispatch unit 502. CPU 506 and controller 508 control operation of SSD array controller 520, processing host commands in disk command register 504. Sector buffer memory 512 temporarily stores sectors of data from host 142 that have not yet been dispatched to one of multiple flash devices 140, 140' by dispatch unit 502.

Alternate Embodiments

Several other embodiments are contemplated by the inventors. Universal-Serial Bus (USB) and other serial buses may be used such as PCI Express, ExpressCard, Firewire (IEEE 1394), serial ATA, serial attached small-computer system interface (SAS), etc., as the interface used between the host and flash device. For example, when PCI Express is used, additional pins for the PCI Express interface can be added or substituted for the USB differential data pins. PCI express pins include a transmit differential pair PET+, PET−, and a receive differential pair PER+, PER− of data pins. A multi-bus-protocol chip could have an additional personality pin to select which serial-bus interface to use, or could have programmable registers. ExpressCard has both the USB and the PCI Express bus, so either or both buses could be present on an ExpressCard device.

Instead of USB or other differential buses mentioned above, SD, MicroSD, MMC, or microMMC interfaces can also be applied in this invention. Rather than use SD buses, other buses may be used such as Memory Stick (MS), Compact Flash (CF), IDE bus, etc. Additional pins can be added or substituted for the SD data pins. A multi-bus-protocol chip could have an additional personality pin to select which bus interface to use, or could have programmable registers. Rather than have a SD microcontroller, a Memory Stick microcontroller could be substituted, for use with a memory-stick interface, etc.

A non-differential interface such as SD, MMC etc, serves as the link between an SSD array controller and each individual flash device. This may be more efficient for handling first-level controller booting as well as local management tasks which relieve the load of a SSD array controller.

Rather than write the initial boot sequence to address 0 in the SRAM, it can be written to another address in SRAM when the CPU can be configured to execute from an address other than address 0.

While a sector size of 512 bytes has been described, the page size may have another size, such as 1K, 2K, 4K, 8K, etc. Flash blocks may have 4 pages, 8 pages, 64 pages, or some other number, depending on the physical flash chips and arrangement used.

While the invention has been described using an SD controller, a MMC controller may be substituted. A combined controller that can function for both MMC and SD may also be substituted. SD may be considered an extension of MMC, or a particular type of MMC, rather than a separate type of bus.

While the invention has been described as not requiring ROM for booting, some ROM may still be present on the chip. For example, a revision number may be included in a small ROM. Hard-wired gates that are tied to power or ground may also function as a read-only memory. While such ROM may be present, ROM is not required for storing boot code or booting instructions. A few bytes or more of ROM may be thus present for other purposes.

Mode logic could sense the state of a pin only at power-on rather than sense the state of a dedicated pin. A certain combination or sequence of states of pins could be used to initiate a mode change, or an internal register such as a configuration register could set the mode.

The microcontroller and SD components such as the bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard SD commands and data transactions to the SD transceiver during a transaction. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device. The partition of SRAM among various functions could change over time.

Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal and flash buses can be used in the SD flash microcontroller to increase throughput. More complex switch fabrics can be substituted for the internal buses.

The flash mass storage chips or blocks can be constructed from any flash technology including multi-level-logic (MLC) memory cells. Data striping could be used with the flash mass storage blocks in a variety of ways, as can parity and error-correction code (ECC). Data re-ordering can be adjusted depending on the data arrangement used to prevent re-ordering for overlapping memory locations. An SD/MMC switch could be integrated with other components or could be a stand-alone chip. The SD/MMC switch could also be integrated with the SD single-chip flash device. While a single-chip device has been described, separate packaged chips or die may be stacked together while sharing I/O pins, or modules may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another a tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A dual-boot caching flash microcontroller comprising:
a flash bus for connecting to a flash-memory chip, the flash bus carrying address, data, and commands to the flash-memory chip;
microcontroller boot code stored in the flash-memory chip in a first block;
host boot code stored in the flash-memory chip in a host-boot block;
a static random-access memory (SRAM) buffer;
a central processing unit (CPU) for executing instructions read from the SRAM buffer;
a host interface for connecting to an external host over a host bus;
a flash-memory interface for generating flash-control signals and for buffering commands, addresses, and data to the flash bus, and for reading and writing the SRAM buffer;
a boot-loader state machine, activated by a reset signal, for activating the flash-memory interface to read the microcontroller boot code from the flash-memory chip, the boot-loader state machine writing the microcontroller boot code to the first block in the SRAM buffer;
a mapping table storing mapping entries each having a logical address from the external host and a physical address of corresponding data stored in the flash-memory chip;
a tag portion of the SRAM buffer for storing tag portions of logical addresses from the external host; and
a data portion of the SRAM buffer for caching data for locations in the flash-memory chip identified by the physical address in a matching entry in the mapping table, the matching entry also storing the logical address having a tag portion in a same cache line as data in the data portion.

2. The dual-boot caching flash microcontroller of claim 1 wherein the host interface further comprises:
a differential transceiver for sending and receiving a stream of differential data to and from the external host over the host bus;
wherein the host bus is a differential-data bus; and
a differential serial interface, coupled to the differential transceiver.

3. The dual-boot caching flash microcontroller of claim 2 wherein the differential serial interface comprises a Universal Serial Bus interface circuit, a PCI-Express interface circuit, a Serial Advanced Technology Attachment (SATA) interface circuit, or an external SATA Interface Circuit.

4. The dual-boot caching flash microcontroller of claim 2 wherein the differential serial interface comprises:
a host serializing unit, coupled to the differential transceiver;
a read FIFO for buffering read words from the host serializing unit; and
a write FIFO for buffering write words to the host serializing unit.

5. The dual-boot caching flash microcontroller of claim 4 further comprising:
a decoder, coupled to the read FIFO, for decoding a format of the read words;
a bit unstuffer for removing stuff bits from the read words;
a receive hold register for storing read words for use by the CPU
a transmit hold register for storing write words from the CPU;
a bit stuffer for inserting stuff bits from the write words; and
an encoder, coupled to the write FIFO, for encoding a format of the write words.

6. The dual-boot caching flash microcontroller of claim 5 wherein the encoder and the decoder use a not-return-to-zero-invert (NRZI) encoding format or an 8-to-10 bit encoding format.

7. The dual-boot caching flash microcontroller of claim 5 wherein the host serializing unit further comprises:
a receive deserializer, coupled to the differential transceiver, for deserializing differential data received from the host to generate read words in a parallel format; and
a transmit serializer, coupled to the differential transceiver, for serializing write words from the write FIFO to generate differential data for transmission to the host by the differential transceiver.

8. The dual-boot caching flash microcontroller of claim 7 further comprising:
a clock circuit for generating a write clock to the write FIFO; and
a delay-line phase-locked loop (PLL), receiving the write clock from the clock circuit, for generating a read clock to the read FIFO.

9. The dual-boot caching flash microcontroller of claim 8 further comprising:
a receive shift register coupled between the receive hold register and the bit unstuffer, for shifting read words; and
a transmit shift register coupled between the transmit hold register and the bit stuffer, for shifting write words.

10. The dual-boot caching flash microcontroller of claim 4 wherein the microcontroller boot code executed by the CPU activates the host interface to send the host boot code to the external host;
further comprising:
flash parameter registers for storing flash parameters indicating access timing and structure of the flash-memory chip;
wherein the boot-loader state machine reads a flash identifier from the flash-memory chip to generate the flash parameters.

11. The dual-boot caching flash microcontroller of claim 10 wherein the microcontroller boot code is temporarily stored in the data portion of the SRAM buffer during booting,
wherein the data portion of the SRAM buffer is activated for caching flash data after booting is completed.

12. The dual-boot caching flash microcontroller of claim 1 wherein the flash microcontroller is one of a plurality of flash microcontrollers that connect to a dispatch unit of a solid-state-disk (SSD) array controller that connects to the external host.

13. A differential flash microcontroller comprising:
external host differential interface means for connecting to an external host by transmission of differential data;
flash bus means for connecting to a flash memory, the flash bus means carrying address, data, and commands to the flash memory;
flash-memory controller means for generating flash-control signals and for buffering commands, addresses, and data to the flash bus means;
volatile buffer means for storing instructions in a volatile memory;
processor means for fetching and executing instructions from the volatile buffer means;
cache means, using the volatile buffer means for storage, for caching data read from the flash memory and for caching data from the external host for writing to the flash memory; and differential transceiver means for physically transmitting differential data over differential lines to the external host, and for receiving differential data sent by the external host over the differential lines;

wherein the differential transceiver means is coupled to the external host differential interface means, whereby differential data from the external host is cached in the volatile buffer means before writing to the flash memory.

14. The differential flash microcontroller of claim 13 further comprising:

tag means for storing a tag portion of a logical address from the external host;

wherein the volatile memory means comprises a static random-access memory (SRAM) wherein the volatile buffer means is also for initially storing boot code read from the flash memory before the volatile buffer means is used by the cache means, whereby the volatile memory means is dual use for booting and caching.

15. The differential flash microcontroller of claim 14 wherein the differential flash microcontroller is one of a plurality of differential flash microcontrollers that connect to a dispatch unit of a solid-state-disk (SSD) controller that connects to the external host.

16. The differential flash microcontroller of claim 13 further comprising:

initial boot loader means, stored in the flash memory, for instructing the processor means to read an extended-local boot sequence means from the flash memory and to write the extended-local boot sequence means into the volatile buffer means; and hardwired initializer means, activated by a reset signal, for activating the flash-memory controller means to read the initial boot loader means from the flash memory, and for writing the initial boot loader means as first instructions to the volatile buffer means.

17. The differential flash microcontroller of claim 16 further comprising:

external-host boot sequence means, stored in the flash memory, for transfer to the external host over the external host differential interface means, wherein the external-host boot sequence means contains instructions for execution by the external host after the external host is re-booted; and extended-local boot sequence means, stored in the flash memory, for instructing the processor means to read the external-host boot sequence means from the flash memory and to write the external-host boot sequence means into the volatile buffer means.

18. The differential flash microcontroller of claim 17 further comprising:

flash parameter register means for storing flash parameters indicating timing and access specifications of the flash memory; and parameter write means, activated by the hardwired initializer means, for reading a flash identifier from the flash memory, for using the flash identifier to generate flash parameters, and for writing the flash parameters to the flash parameter register means;

wherein the flash-memory controller means reads the flash parameters from the flash parameter register means to generate flash-control signals that meet the timing and access specifications of the flash memory, whereby flash parameters are extracted during initialization.

19. The differential flash microcontroller of claim 17 further comprising:

mapping table means for storing mapping entries that associate a logical address from the external host with a physical address in the flash memory or in the volatile buffer means.

20. The differential flash microcontroller of claim 17 wherein the external host differential interface means further comprises:

a Universal Serial Bus interface circuit, a Secure Digital (SD) interface circuit, a Multi Media Card (MMC) interface circuit, a PCI-Express interface circuit, a Serial Advanced Technology Attachment (SATA) interface circuit, or an external SATA Interface Circuit.

* * * * *